US012795737B2

(12) United States Patent
Liu

(10) Patent No.: US 12,795,737 B2
(45) Date of Patent: Nov. 10, 2026

(54) RANDOM ACCESS METHOD AND APPARATUS, AND STORAGE MEDIUM

(71) Applicant: Beijing Xiaomi Mobile Software Co., Ltd., Beijing (CN)

(72) Inventor: Xiaofei Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 360 days.

(21) Appl. No.: 18/576,013

(22) PCT Filed: Jul. 6, 2021

(86) PCT No.: PCT/CN2021/104834
§ 371 (c)(1),
(2) Date: Jan. 2, 2024

(87) PCT Pub. No.: WO2023/279264
PCT Pub. Date: Jan. 12, 2023

(65) Prior Publication Data
US 2024/0340963 A1 Oct. 10, 2024

(51) Int. Cl.
*H04W 74/0833* (2024.01)

(52) U.S. Cl.
CPC ................................ *H04W 74/0833* (2013.01)

(58) Field of Classification Search
CPC ......................... H04B 7/2603; H04B 7/06966; H04B 7/0696; H04W 74/0833; H04W 74/006; H04L 5/0048; H04L 5/0053; H04L 5/0091
See application file for complete search history.

(56) References Cited

U.S. PATENT DOCUMENTS

2017/0367120 A1* 12/2017 Murray ................ H04B 7/0696
2020/0314913 A1* 10/2020 Rastegardoost ...... H04L 5/0048

FOREIGN PATENT DOCUMENTS

CN 112913319 A 6/2021
WO 2020194934 A1 10/2020

OTHER PUBLICATIONS

International Search Report and Written Opinion of International Application No. PCT/CN2021/104834, dated Mar. 28, 2022, 12 pages.

(Continued)

*Primary Examiner* — Mahran Y Abu Roumi
(74) *Attorney, Agent, or Firm* — Finnegan, Henderson, Farabow, Garrett & Dunner, L.L.P.

(57) ABSTRACT

A random access method is performed by a user equipment (UE). The method includes: receiving resource configuration information sent by a base station; determining slice information of a target network slice that triggers a random access; determining a first random access resource according to at least one of the resource configuration information or the slice information; and initiating the random access based on the first random access resource; wherein the resource configuration information is used to configure at least one of: a common random access resource; a specified random access resource corresponding to at least one network slice; a two-step random access resource; a four-step random access resource; a two-step common random access resource; a four-step common random access resource; a two-step specified random access resource; or a four-step specified random access resource.

20 Claims, 6 Drawing Sheets

(56) References Cited

OTHER PUBLICATIONS

"Discussion on slice based RACH configuration", CMCC, 3GPP TSG-RAN WG2 Meeting #114-e, R2-2106225, Electronic Meeting, May 19-27, 2021, 8 pages.
Notice of Reasons for Refusal issued by the Japanese Patent Office on Dec. 24, 2024, in corresponding Application No. JP 2024-500328, 10 pages.
Extended European Search Report Issued in Application No. 21948762.6 dated Jul. 15, 2024, 9 pages.
"Further discussion on slice specific RACH", Qualcomm Incorporated, 3GPP TSG RAN WG2 Meeting #114-e, R2-2104741, E-Conference, May 19-27, 2021, 10 pages.
The First Office Action issued by the State Intellectual Property Office of People's Republic of China on Apr. 19, 2025, in corresponding Application No. CN 202180001902.5, 26 pages.

* cited by examiner

RANDOM ACCESS METHOD AND APPARATUS, AND STORAGE MEDIUM

CROSS-REFERENCE TO RELATED APPLICATION

This application is a U.S. National Phase application of International Application No. PCT/CN2021/104834, filed Jul. 6, 2021, the entire contents of which are incorporated herein by reference.

TECHNICAL FIELD

The present disclosure relates to the field of communication, and more particularly, to a random access method and device, and a storage medium.

BACKGROUND

A network slice can provide a complete end-to-end virtual network for a specific user. By dividing the network resource into multiple network slices, 5G (5th generation mobile networks, 5th generation mobile communication technology) network slices can provide differentiated services for users with different service requirements. Among them, different service requirements include, but are not limited to, latency, reliability, capacity, isolation and other functions. The operator network will not only serve information consumption business with best effort transmission as the communication requirement characteristics, but also can meet production control services with deterministic transmission as the communication requirement, so as to allocate logically or physically isolated network resources for services with different communication requirements.

A network slice may consist of a radio access network (RAN) part and a core network (CN) part. The implementation of the network slice depends on a principle that traffic of different slices is processed by different protocol data unit (PDU) sessions. The network can implement different network slices by scheduling and providing different L1 layer/L2 layer configurations.

The random access process includes: a contention random access and a contention free random access. In the contention random access, a random access request resource (i.e., a resource used by MSG1) is not dedicated to a user equipment (UE), that is, multiple users may initiate random access requests on a same time-frequency domain resource, so that the relationship between the base station and the UE needs to be established through a contention resolution process. In the contention free random access, the random access request resource is allocated by the base station to a specified UE, and the base station can uniquely identify the UE once it identifies the random access resource dedicated to the UE.

SUMMARY

According to a first aspect of embodiments of the present disclosure, there is provided a random access method, which is performed by a user equipment (UE) and includes: receiving resource configuration information sent by a base station: determining slice information of a target network slice that triggers a random access: determining a first random access resource according to at least the resource configuration information and the slice information; and initiating the random access based on the first random access resource. The resource configuration information is used to configure at least one of: a common random access resource: a specified random access resource corresponding to at least one network slice: a two-step random access resource: a four-step random access resource: a two-step common random access resource: a four-step common random access resource: a two-step specified random access resource: or a four-step specified random access resource.

According to a second aspect of embodiments of the present disclosure, there is provided a random access method, which is performed by a base station and includes: sending resource configuration information to a user equipment (UE). The resource configuration information is used to configure at least one of: a common random access resource: a specified random access resource corresponding to at least one network slice: a two-step random access resource: a four-step random access resource: a two-step common random access resource: a four-step common random access resource: a two-step specified random access resource: or a four-step specified random access resource.

According to a third aspect of embodiments of the present disclosure, there is provided a computer-readable storage medium having stored therein a computer program that, when executed by a processor, causes the processor to perform the random access method according to the first aspect.

According to a fourth aspect of embodiments of the present disclosure, there is provided a computer-readable storage medium having stored therein a computer program that, when executed by a processor, causes the processor to perform the random access method according to the second aspect.

According to a fifth aspect of embodiments of the present disclosure, there is provided a random access device, which includes: a processor; and a memory for storing an instruction executable by the processor. The processor is configured to perform the random access method according to the first aspect.

According to an sixth aspect of embodiments of the present disclosure, there is provided a random access device, which includes: a processor; and a memory for storing an instruction executable by the processor. The processor is configured to perform the random access method according to the second aspect.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
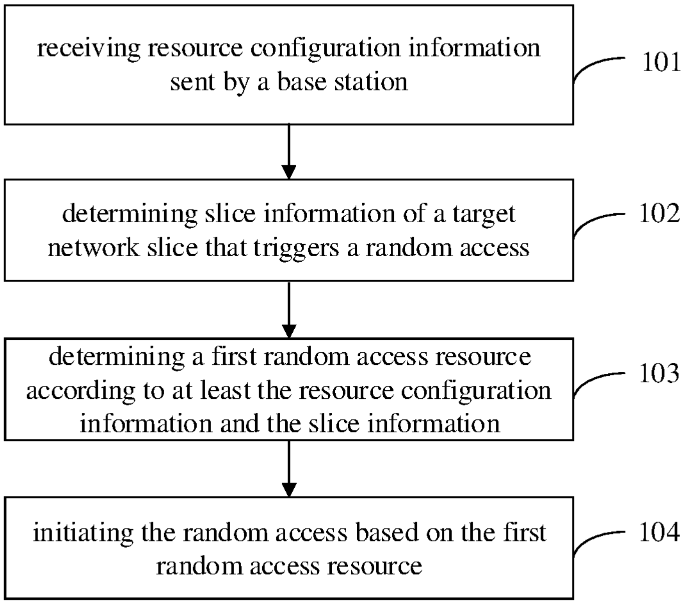
FIG. 1 is a schematic flowchart showing a random access method according to an illustrative embodiment.

Illustrative embodiments will be described in detail herein, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of devices and methods consistent with some aspects of the present disclosure as recited in the appended claims.

Terms used in embodiments of the present disclosure are for the purpose of describing specific embodiments, but should not be construed to limit the present disclosure. As used in the present disclosure and the appended claims, “a/an”, “said” and “the” in singular forms are intended to include plural forms, unless clearly indicated in the context otherwise. It should also be understood that, the term “and/or” used herein represents and contains any or all possible combinations of one or more associated listed items.

It should be understood that, although terms such as “first,” “second” and “third” may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. Depending on the context, the term “if” as used herein may be construed to mean “when” or “upon” or “in response to determining”.

In embodiments of the present disclosure, a UE using a certain slice service may initiate a random access based on a common random access channel (RACH) resource. Considering that multiple UEs use the common RACH resource to initiate the random access, it is likely to cause network congestion.

In order to solve this technical problem, a separate specified RACH resource may be configured for each network slice or each network slice group.

In Release 16 (R16), a two-step random access manner was introduced, in which Msg1 (message 1) and Msg3 (message 3) in a four-step random access manner are merged into MsgA (message A), and two downlink channel messages, i.e., Msg2 (message 2) and Msg4 (message 4), are merged into a new MsgB (message B), so that the random access process is simplified, thereby reducing delay and signaling overhead. Before initiating a random access, the user equipment (UE) needs to determine a random access (RA) category.

A fallback mechanism will be introduced now. For the two-step random access manner, when the number of retransmissions of the MsgA reaches a certain threshold, RA category switching will be triggered to switch to the four-step random access manner to repeat the access attempt of Msg1. The threshold is configured by a base station in a system message.

In addition to switching to the four-step random access manner when the number of retransmissions reaches the threshold, a fallback mechanism is also stipulated. A trigger condition of the fallback mechanism is as follows. When a preamble in the MsgA can be detected correctly, but the demodulation of a physical uplink shared channel (PUSCH) message fails, the base station feeds back a fallback random access response (fallbackRAR) message, similar to the Msg2 in the four-step random access manner, for scheduling the transmission of the Msg3. In this case, if retransmission occurs due to failed transmission of the Msg3, the two-step random access manner needs to be adopted preferentially.

At present, for configuration of random access resources, the selection of a suitable random access resource to initiate the random access and how to implement a resource fallback when it needs to be performed are problems to be further improved. To solve these problems, the present disclosure provides the following random access solutions.

The random access solutions provided by the present disclosure will be introduced first from the side of the user equipment.

Embodiments of the present disclosure provide a random access method, which may be performed by a user equipment (UE). Referring to FIG. 1, which is a schematic flowchart showing a random access method according to an illustrative embodiment, the method may include the following steps.

In step 101, resource configuration information sent by a base station is received.

In embodiments of the present disclosure, the resource configuration information is used to configure at least one of: a common random access resource: a specified random access resource corresponding to at least one network slice: a two-step random access resource: a four-step random access resource: a two-step common random access resource: a four-step common random access resource: a two-step specified random access resource: or a four-step specified random access resource.

The common random access resource is a random access resource shared by a plurality of UEs. In an example, the plurality of UEs include a UE supporting a network slice function and a UE not supporting the network slice function. That is, the common random access resource is a random access resource shared by the UE supporting the network slice function and the UE not supporting the network slice function.

In an implementation, the plurality of UEs only include UEs that support the network slice function. That is, the common random access resource is a random access resource shared by the UEs supporting the network slice function.

The specified random access resource corresponding to at least one network slice refers to a resource configured separately for each network slice and used for a UE under the network slice to initiate a random access. For example, a specified random access resource corresponding to network slice 1 includes resource 1, a specified random access resource corresponding to network slice 2 includes resource 2, and so on. In some embodiments, the specified random access resource corresponding to at least one network slice refers to a resource configured for each network slice group and used for a UE under each network slice in the network slice group to initiate a random access. Each network slice group may include two or more network slices.

The two-step random access resource refers to a resource available for a UE when the UE adopts the two-step random access manner. Correspondingly, the four-step random access resource refers to a resource available for a UE when the UE adopts the four-step random access manner.

The two-step common random access resource refers to a combined resource that is shared by a plurality of UEs and is available when the two-step random access manner is adopted. The four-step common random access resource refers to a combined resource that is shared by a plurality of UEs and is available when the four-step random access manner is adopted.

The two-step specified random access resource refers to a combined resource that is provided for a UE in a certain network slice and is available when the two-step random access manner is adopted. The four-step specified random access resource refers to a combined resource that is provided for a UE in a certain network slice and is available when the four-step random access manner is adopted.

In step 102, slice information of a target network slice that triggers a random access is determined.

In embodiments of the present disclosure, the target network slice is a network slice used for the user equipment to initiate the random access. That is, the target network slice may be a network slice where the user equipment is triggered to initiate the random access.

In step 103, a first random access resource is determined according to at least the resource configuration information and the slice information.

In step 104, the random access is initiated based on the first random access resource.

In the above embodiments, according to the slice information of the target network slice used for the user equipment to initiate the random access and the resource configuration information sent by the network side, the first random access resource for initiating the random access may be determined from random access resources configured by the resource configuration information, so as to reduce the possibility of collisions between a UE using a certain slice service and other UEs during the random access, and improve the success rate of the random access of the UE, so that the UE can quickly complete the random access and obtain the desired slice service.

In some embodiments, for the above step 101, the UE may receive the resource configuration information in any of the following manners.

In an implementation, for an initial random access process of the UE, the UE may receive a system message carrying the resource configuration information sent by the base station.

In an implementation, for a random access process triggered by a physical downlink control channel (PDCCH) instruction, the UE may receive a PDCCH instruction carrying the resource configuration information.

In an implementation, for a case where the UE has established a radio resource control (RRC) connection with the base station, that is, an RRC message sent by the base station triggers the UE to initiate the random access, the UE may receive the RRC message carrying the resource configuration information.

The resource configuration information is used to configure at least one of: a common random access resource: a specified random access resource corresponding to at least one network slice: a two-step random access resource: a four-step random access resource: a two-step common random access resource: a four-step common random access resource: a two-step specified random access resource: or a four-step specified random access resource.

In the above embodiments, the UE may obtain the resource configuration information in various ways, which improves the success rate of the random access with high usability.

In some embodiments, the UE may determine the slice information of the target network slice that triggers the random access in any of the following manners, but not limited thereto.

In an implementation, the UE may obtain the slice information of the target network slice sent by a non-access stratum (NAS) to an access stratum (AS) when requesting the AS to initiate an RRC connection in the NAS.

In an implementation, for the random access triggered by paging at the network side, the UE may receive a paging message carrying the slice information of the target network slice sent by the base station.

In an implementation, for the random access process triggered by a PDCCH instruction, the UE may receive the PDCCH instruction carrying the slice information of the target network slice sent by the base station.

In an implementation, in a case where logical channel identifiers are associated with slice information, the UE may determine the presence of a logical channel for data to be transmitted, determine slice information associated with the logical channel according to the channel identifier of the logical channel, and determine the slice information as the slice information of the target network slice. In some embodiments, the association between the logical channel identifiers and the slice information may include, but is not limited to, that different logical channel identifiers correspond to the same or different slice information.

In embodiment of the present disclosure, the number of target network slices that trigger the random access may be one or more, which is not limited in the present disclosure. When the number of target network slices that trigger the random access is more than one, a specified random access resource corresponding to a target network slice with a high priority may be determined as the first random access resource based on the priority of target network slices. The priority of different network slices may be determined by the NAS of the UE and provided to the AS.

In embodiments of the present disclosure, the slice information of the target network slice may include but not limited to at least one of: single-network slice selection assistance information (S-NSSAI), a slice service type (SST), a slice differentiator (SD), a slice index, a slice identifier or a slice group identifier, an operator-defined access category. Of course, the slice information of the target network slice may also be other information that can uniquely identify the slice, which is not limited in the present disclosure.

In the above embodiments, the UE may determine the slice information of the target network slice in different ways, and then may determine the first random access resource for initiating the random access from random access resources configured by the resource configuration information according to the slice information of the target network slice and the received resource configuration information, so as to reduce the possibility of the UE using a slice business suffering from a collision during the random access, and improve the success rate of the random access of the UE, so that the UE can quickly complete the random access and obtain the desired slice service.

In some embodiments, the UE may adopt any of the following manners to determine the first random access resource.

In a first manner, one of the common random access resource and the specified random access resource corresponding to the target network slice may be selected as the first random access resource.

In an implementation, if it is determined according to the resource configuration information and the slice information of the target network slice that the base station has configured at least the specified random access resource corresponding to the target network slice, the specified random access resource corresponding to the target network slice may be determined as a candidate resource. Further, the candidate resource may be directly used as the first random access resource. That is, the UE may use the specified random access resource corresponding to the target network slice as the first random access resource to initiate the random access.

In an implementation, if it is determined according to the resource configuration information and the slice information of the target network slice that the base station has not configured the specified random access resource corresponding to the target network slice, but has configured the common random access resource, the common random access resource may be determined as a candidate resource. Further, the candidate resource may be directly used as the first random access resource.

In an implementation, it is determined according to the resource configuration information and the slice information that the base station has configured at least the specified random access resource corresponding to the target network slice and the common random access resource, the UE may further determine which resource is selected as a candidate resource according to a signal quality, and directly determine the candidate resource as the first random access resource for initiating the access resource.

The UE may measure the signal quality, and determine the specified random access resource corresponding to the target network slice as the candidate resource if the signal quality is greater than a first threshold, and then determine the candidate resource as the first random access resource.

In some embodiments, the UE measures a signal quality of a channel, and determines the common random access resource as the candidate resource if the signal quality is less than or equal to a first threshold, and then determines the candidate resource as the first random access resource.

In the above embodiments, the first threshold may be used by the UE to determine whether the specified random access resource corresponding to the target network slice can be selected as the first random access resource to initiate the random access. The first threshold may be configured by the base station.

In an implementation, the first threshold may be configured by the base station via a first system message broadcasted. According to the first system message received for configuring the first threshold corresponding to at least one network slice, the UE determines the first threshold. The first threshold may be configured by the base station and correspond to the target network slice, or the first threshold may be configured by the base station and correspond to a network slice group in which the target network slice is included.

In some embodiments, the base station may configure the same or different first thresholds for each network slice via the first system message, or the base station may configure the same or different first thresholds for each network slice group via the first system message, and each network slice group includes two or more network slices.

For example, the base station may configure threshold 1 as the first threshold corresponding to network slice 1 via a system message, configure threshold 2 as the first threshold corresponding to network slice 2 via a system message, and so on. The threshold 1 and the threshold 2 may be same or different. When the target network slice is the network slice 1, the corresponding first threshold is the threshold 1.

For another example, the base station may configure threshold 3 as the first threshold corresponding to network slice group 1 via a system message, configure threshold 4 as the first threshold corresponding to network slice group 2 via a system message, and so on. The network slice group 1 includes network slice 1 and network slice 2, and the network slice group 2 includes network slice 3 and network slice 4. When the target network slice is the network slice 1, the corresponding first threshold is the threshold 3.

In an implementation, the base station may configure the first threshold corresponding to at least one network slice for the UE via a dedicated signaling, and the dedicated signaling may be a radio resource control (RRC) message. That is, the base station may configure the first threshold corresponding to at least one network slice for the UE via a first RRC message.

It should be noted that if the base station configures the first threshold corresponding to at least one network slice for the UE via both the system message and the RRC message, the UE may use the first threshold configured via the RRC message.

In the above embodiments, the UE may select the specified random access resource corresponding to the target network slice or the common random access resource to initiate the random access according to the first threshold configured by the base station and the signal quality, which is easy to implement and has high usability.

In a second manner, one of the two-step random access resource and the four-step random access resource is selected as the first random access resource.

In an implementation, if the base station has configured only the two-step random access resource or the four-step random access resource, the UE directly uses the two-step random access resource or the four-step random access resource configured by the base station as a candidate resource, and directly determines the candidate resource as the first random access resource.

In an implementation, the base station has configured both the two-step random access resource and the four-step random access resource, the UE may determine the two-step random access resource as a candidate resource when determining that a signal quality is greater than a second threshold, and directly determine the candidate resource as the first random access resource.

In an implementation, the base station has configured both the two-step random access resource and the four-step random access resource, the UE may determine the four-step random access resource as a candidate resource when determining that a signal quality is less than or equal to a second threshold, and directly determine the candidate resource as the first random access resource.

In an implementation, the second threshold may include a second threshold #1, which is specifically used for the UE to determine whether the two-step common random access resource can be selected as the first random access resource to initiate the random access. In this case, the second threshold #1 may be configured by the base station via a second system message or a second RRC message. Specifically, the second threshold #1 may reuse a reference signal received power (RSRP) threshold in the related art, i.e., a legacy RSRP threshold, or the second threshold may be configured by the base station as another value different from the legacy RSRP threshold.

For example, in a case where the base station has configured the two-step common random access resource, the four-step common random access resource and the four-step specified random access resource, and the signal quality is greater than the second threshold #1, the UE may select the two-step common random access resource to initiate the random access.

In an implementation, the second threshold may include a second threshold #2, which is used for the UE to determine whether the two-step specified random access resource can be selected as the first random access resource to initiate the random access. The second threshold #2 may also be configured by the base station via the second system message or the second RRC message, may reuse a legacy RSRP threshold, or may be configured by the base station for each network slice or each network slice group, or may reuse the first threshold, which is not limited in the present disclosure. The second threshold #2 may be the same as or different from the second threshold #1, which is also not limited in the present disclosure.

For example, in a case where it is determined according to the resource configuration information that the base station has configured the two-step specified random access resource, the four-step common random access resource, and the four-step specified random access resource, and the signal quality is greater than the second threshold #2, the UE may select the two-step specified random access resource as the first random access resource.

In an implementation, the second threshold may be configured by the base station via the second system message broadcasted, including but not limited to at least one of the second threshold #1 and the second threshold #2.

The second system message may be the same as or different from the first system message, which is not limited in the present disclosure.

In an implementation, the base station may configure the second threshold for the UE via a dedicated signaling, including but not limited to at least one of the second threshold #1 and the second threshold #2. The dedicated signaling may be the second RRC message. The second RRC message may be the same as or different from the first RRC message, which is not limited in the present disclosure.

Similarly, if the base station configures the second threshold for the UE via both the system message and the RRC message, the UE may use the second threshold configured via the RRC message.

In the above embodiments, the UE may select the two-step random access resource or the four-step random access resource to initiate the random access according to the second threshold configured by the base station and the measured signal quality, which is easy to implement and has high usability.

The above two manners can exist independently. In the case of independent existence, it is equivalent to the case where the candidate resource includes any one of the common random access resource, the specified random access resource corresponding to the target network slice, the two-step random access resource, or the four-step random access resource, the candidate resource is directly used as the first random access resource.

In embodiment of the present disclosure, the above two manners may also exist in combination, i.e., the third manner to be described below. When the above two manners are combined, the order of combination is not distinguished. That is, it is possible to determine the candidate resource in accordance with the first manner above, and then determine the first random access resource from the candidate resource in accordance with the second manner. In some embodiments, it is possible to determine the candidate resource in accordance with the second manner above, and then determine the first random access resource from the candidate resource in accordance with the first manner. The details are as follows.

In a third manner, the above first manner and second manner may be combined to determine the first random access resource.

In an implementation, the common random access resource or the specified random access resource corresponding to the target network slice may be selected as the candidate resource in accordance with the first manner above, and then the two-step random access resource or the four-step random access resource may be selected from the candidate resource in accordance with the second manner above, to finally select a combined resource as the first random access resource.

In an implementation, the two-step random access resource or the four-step random access resource may be selected as the candidate resource in accordance with the second manner above, and then the common random access resource or the specified random access resource corresponding to the target network slice may be selected from the candidate resource in accordance with the first manner above, to finally select a combined resource as the first random access resource.

In the following, different combinations will be described.

In a first case, the common random access resource is determined as the candidate resource in accordance with the first manner, and then the two-step random access resource or the four-step random access resource is selected in accordance with the above second manner, to finally determine the two-step common random access resource or the four-step common random access resource as the first random access resource.

Specifically, after the common random access resource is determined as the candidate resource, if it is determined according to the resource configuration information that the base station has only configured the two-step common random access resource, the UE directly determines the two-step common random access resource as the first random access resource.

In some embodiments, after the common random access resource is determined as the candidate resource, if it is determined according to the resource configuration information that the base station has only configured the four-step common random access resource, the UE directly determines the four-step common random access resource as the first random access resource.

In some embodiments, after the common random access resource is determined as the candidate resource, if it is determined according to the resource configuration information that the base station has configured the two-step common random access resource and the four-step common random access resource, the UE may select the two-step common random access resource as the first random access resource in a case where the signal quality of the channel is greater than the above second threshold #1, and select the four-step common random access resource as the first random access resource in a case where the signal quality of the channel is less than or equal to the second threshold #1. The second threshold #1 is used for the UE to determine whether the two-step common random access resource can be selected as the first random access resource to initiate the random access. The second threshold #1 may also be configured by the base station via the second system message or the second RRC message, specifically may reuse the legacy RSRP threshold, or may be configured by the base station as another value different from the legacy RSRP threshold.

In a second case, the specified random access resource corresponding to the target network slice may be determined as the candidate resource in accordance with the above first manner, and then the two-step random access resource or the four-step random access resource is selected from the candidate resource in accordance with the above second manner, to finally determine the two-step specified random access resource or the four-step specified random access resource as the first random access resource.

Specifically, after the random access resource corresponding to the target network slice is determined as the candidate resource, if it is determined according to the resource configuration information that the base station has only configured the two-step specified random access resource or the four-step specified random access resource, the UE directly determines the two-step specified random access resource or the four-step specified random access resource as the first random access resource.

In some embodiments, after the random access resource corresponding to the target network slice is determined as the candidate resource, if it is determined according to the resource configuration information that the base station has configured two-step specified random access resource and the four-step specified random access resource, the UE may select the two-step specified random access resource as the first random access resource in a case where the signal quality is greater than the second threshold #2, and select the four-step specified random access resource as the first random access resource in a case where the signal quality is less than or equal to the second threshold #2. The second threshold #2 is used for the UE to determine whether the two-step specified random access resource can be selected as the first random access resource to initiate the random access. The second threshold may also be configured by the base station via the second system message or the second RRC message, specifically may reuse the legacy RSRP threshold, or may be configured by the base station for each network slice or each network slice group, or may reuse the first threshold, which is not limited in the present disclosure. The second threshold #2 may be the same as or different from the second threshold #1, which is also not limited in the present disclosure.

In a third case, the two-step random access resource may be selected as the candidate resource in accordance with the above second manner, and then the common random access resource or the specified random access resource corresponding to the target network slice is selected from the candidate resource in accordance with the above first manner, to finally select the two-step common random access resource or the two-step specified random access resource as the first random access resource.

Specifically, if the base station has configured only the two-step common random access resource, and has not configured the two-step specified random access resource, the UE directly selects the two-step common random access resource as the first random access resource.

In some embodiments, in a case where the base station has configured at least the two-step specified random access resource, the two-step specified random access resource is directly selected as the first random access resource.

In some embodiments, in a case where the base station has configured the two-step common random access resource and the two-step specified random access resource, the UE preferentially selects the two-step specified random access resource as the first random access resource.

In some embodiments, in a case where the base station has configured the two-step common random access resource and the two-step specified random access resource, the UE selects the two-step specified random access resource as the first random access resource if a channel quality is greater than the second threshold #2: otherwise, the UE selects the two-step common random access resource as the first random access resource. The second threshold #2 is used for the UE to determine whether the two-step specified random access resource can be selected as the first random access resource to initiate the random access. The second threshold #2 may be configured by the base station via the second system message or the second RRC message, or the second threshold may reuse the legacy RSRP threshold, or may be configured by the base station for each network slice or each network slice group, or may reuse the first threshold, which is not limited in the present disclosure.

In a fourth case, the four-step random access resource may be selected as the candidate resource in accordance with the above second manner, and then the common random access resource or the specified random access resource corresponding to the target network slice is selected from the candidate resource in accordance with the above first manner, to finally select the four-step common random access resource or the four-step specified random access resource as the first random access resource.

Specifically, if the base station has configured only the four-step common random access resource, and has not configured the four-step specified random access resource, the UE directly selects the four-step common random access resource as the first random access resource.

In some embodiments, in a case where the base station has configured at least the four-step specified random access resource, the four-step specified random access resource is directly selected as the first random access resource.

In some embodiments, in a case where the base station has configured the four-step common random access resource and the four-step specified random access resource, the UE selects the four-step specified random access resource as the first random access resource if a channel quality is greater than the first threshold; and selects the four-step common random access resource as the first random access resource if the channel quality is less than or equal to the first threshold. Here, the threshold for the UE to determine whether the four-step specified random access resource can be selected may directly reuse the first threshold. Certainly, the threshold for the UE to determine whether the four-step specified random access resource can be selected may also be configured as another value different from the first threshold, which is not limited in the present disclosure.

In the above embodiments, with any of the above manners, the first random access resource for initiating the random access may be determined from at least one random access resource configured by the resource configuration information, so as to quickly complete the random access and obtain the desired slice service with high usability.

Figure 2:
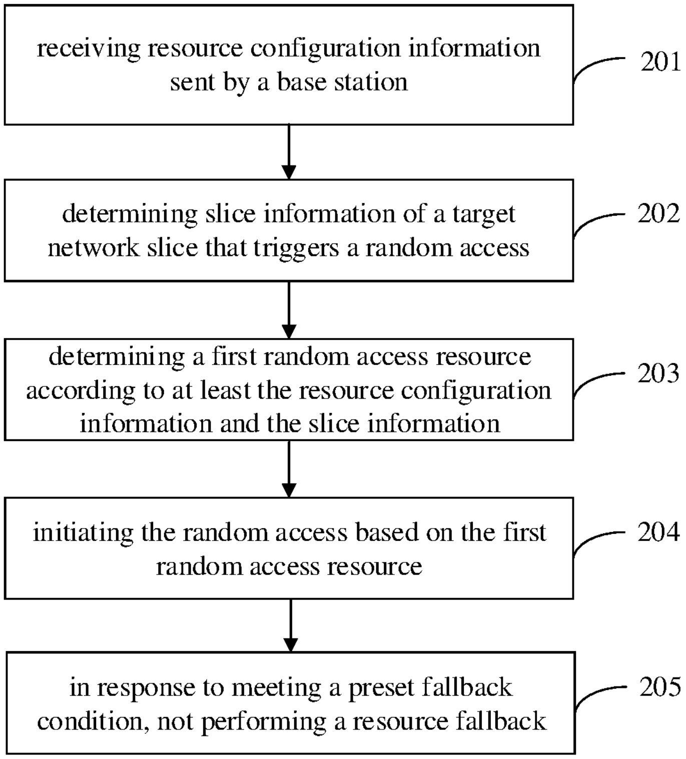
FIG. 2 is a schematic flowchart showing a random access method according to an illustrative embodiment.

In some embodiments, embodiments of the present disclosure provide a random access method, which may be performed by a user equipment (UE). Referring to FIG. 2, which is a schematic flowchart showing a random access method according to an embodiment, the method may include the following steps.

In step 201, resource configuration information sent by a base station is received.

In step 202, slice information of a target network slice that triggers a random access is determined.

In step 203, a first random access resource is determined according to at least the resource configuration information and the slice information.

In step 204, the random access is initiated based on the first random access resource.

In step 205, a resource fallback is not performed in response to meeting a preset fallback condition.

In an implementation, when the specified random access resource corresponding to the target network slice is used as the first random access resource to initiate the random access, and the preset fallback condition is met, the resource fallback is not performed.

In an implementation, when the common random access resource is used as the first random access resource to initiate the random access, and the preset fallback condition is met, the resource fallback is not performed.

The preset fallback condition includes any one of: a number of failures of the random access initiated based on the first random access resource reaching a first fallback threshold: a first fallback timer expiring: or receiving a random access resource fallback indication message corresponding to the target network slice.

In the above embodiments, when the preset fallback condition is met, the resource fallback may not be performed, with a high usability.

Figure 3:
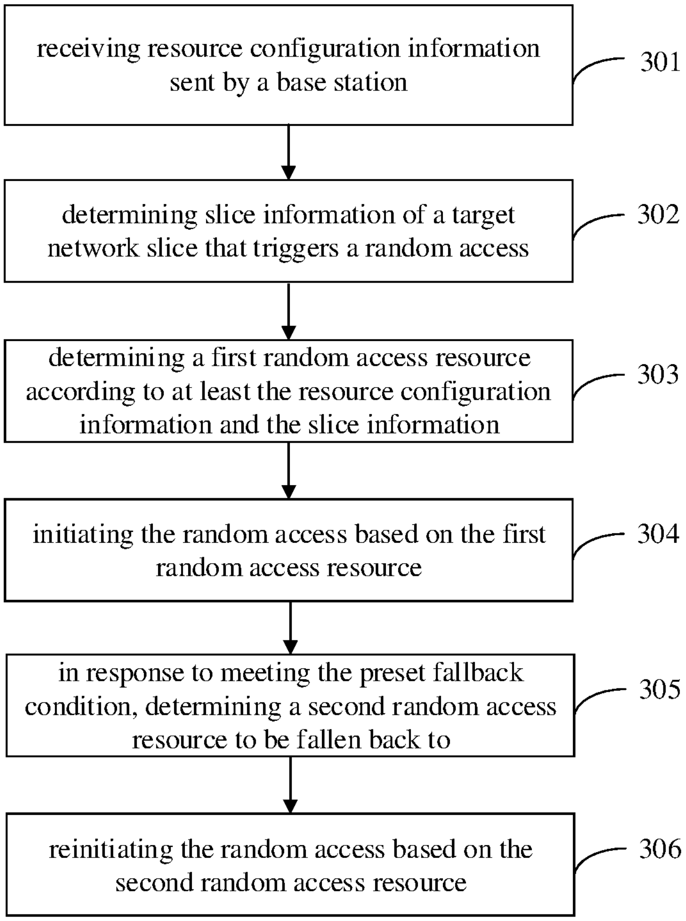
FIG. 3 is a schematic flowchart showing a random access method according to an illustrative embodiment.

In some embodiments, embodiments of the present disclosure provide a random access method, which may be performed by a user equipment (UE). Referring to FIG. 3, which is a schematic flowchart showing a random access method according to an embodiment, the method may include the following steps.

In step 301, resource configuration information sent by a base station is received.

In step 302, slice information of a target network slice that triggers a random access is determined.

In step 303, a first random access resource is determined according to at least the resource configuration information and the slice information.

In step 304, the random access is initiated based on the first random access resource.

In step 305, in response to meeting a preset fallback condition, a second random access resource to be fallen back to is determined.

The random access is reinitiated based on the second random access resource. The preset fallback condition includes any one of: a number of failures of the random access initiated based on the first random access resource reaching a first fallback threshold; a first fallback timer expiring; or receiving a random access resource fallback indication message corresponding to the target network slice.

In step 306, the random access is reinitiated based on the second random access resource.

In the above embodiments, when multiple collisions occur in the first random access resource, the user equipment may perform the resource fallback, and reinitiate the random access based on the second random access resource fallen back to, so as to avoid the UE to initiate the random access always in the first random access resource until reaching the a maximum number of the random access result in the failure of the random access, and to improve the success rate of the random access of the UE.

In some embodiments, after initiating the random access based on a certain random access resource, and in response to determining that the preset fallback condition is met, the UE may respond in any of the following manners:

As a first manner, not performing the resource fallback.

As a second manner, performing the resource fallback.

Correspondingly, the UE may determine the random access resource to be fallen back to, and reinitiate the random access based on the random access resource fallen back to.

The random access resource initiating the random access is different from the random access resource to be fallen back to. For example, the UE initiates the random access based on the first random access resource, and in response to determining that the preset fallback condition is met, the UE reinitiates the random access based on the second random access resource fallen back to. The second random access resource is different from the first random access resource.

In the above embodiments, when the preset fallback condition is met, the UE may not perform the resource fallback or reinitiate the random access based on the second random access resource fallen back to, so as to avoid the high failure rate of the random access caused by repeatedly using the first random access resource to continuously initiate the random access.

In some embodiments, if the preset fallback condition is met again in the process of reinitiating the random access based on the second random access resource, the UE may not perform the fallback again, or still perform the fallback, in the latter case, a third random access resource to be fallen back to needs to be determined, and the random access is initiated again based on the third random access resource.

The process of determining the third random access resource is similar to the process of determining the second random access resource, and thus will not be elaborated here. The third random access resource is different from the second random access resource.

In some embodiments, the above two situations may be combined. That is, in response to meeting the preset fallback condition when the random access is reinitiated based on the second random access resource, the resource fallback is not performed. In some embodiments, in response to meeting the preset fallback condition when the random access is reinitiated based on the second random access resource, the third random access resource to be fallen back to is determined, and the random access is reinitiated based on the third random access resource. The process of determining the third random access resource is similar to the process of determining the second random access resource, which will be introduced together in the following embodiments and will not be introduced here.

In an implementation, the preset fallback condition may include that the number of failures of the random access initiated based on the first random access resource reaches the first fallback threshold. Here, the first fallback threshold may be used to indicate an allowed cumulative number of failures of the random access initiated based on the first random access resource before falling back to the second random access resource to perform the random access.

For example, if the first fallback threshold is N1, the UE determines that the preset fallback condition is met when the number of failures of the random access initiated by the UE based on the first random access resource reaches N1, and the UE may fall back to the second random access resource to reinitiate random access.

In embodiments of the present disclosure, the first fallback threshold may be configured by the base station. In an implementation, the first fallback threshold may be configured by the base station via a third system message broadcasted. In some embodiments, the first fallback threshold may reuse a fallback threshold in a related mechanism, i.e., a legacy threshold. In some embodiments, the first fallback threshold may be configured by the base station for each network slice or each network slice group via the third system message.

In an implementation, the first fallback threshold may be configured by the base station via a third RRC message. Likewise, the first fallback threshold may reuse a fallback threshold in a related mechanism, i.e., a legacy threshold. In some embodiments, the first fallback threshold may be configured by the base station for each network slice or each network slice group via the third RRC message.

In an implementation, the preset fallback condition may include that the first fallback timer expires. The first fallback timer is used to indicate an accumulative duration allowed for initiating the random access based on the first random access resource before falling back to the second random access resource to perform the random access.

For example, if a duration of the first fallback timer is t1, the UE determines that the preset fallback condition is met when the accumulative duration for which the UE initiates the random access based on the first random access resource reaches t1, and the UE may fall back to the second random access resource to reinitiate the random access.

In embodiments of the present disclosure, the first fallback timer may be configured by the base station. In an implementation, the first fallback timer may be configured by the base station via a fourth system message broadcasted. In an implementation, the first fallback timer may be configured by the base station via a fourth RRC message.

In an implementation, the preset fallback condition may include that the random access resource fallback indication message corresponding to the target network slice is received.

In embodiments of the present disclosure, according to the random access resource fallback indication message corresponding to the target network slice sent by the network side, the UE may determine that the preset fallback condition is met, and fall back to the second random access resource to reinitiate the random access.

It may be understood that the preset fallback condition may include any one of the above items or a combination thereof, and other possible preset fallback conditions shall fall within the protection scope of the present disclosure.

In the above embodiments, the UE may perform the resource fallback when the above preset fallback condition is met, and reinitiate the random access in the second random access resource fallen back to, which improves the success rate of random access.

In some embodiments, the random access resource fallback indication message may be used to configure at least one of a second fallback threshold or a second fallback timer. The second fallback threshold is used to indicate an allowed number of failures of the random access initiated based on the second random access resource before re-falling back to the first random access resource from the second random access resource to initiate the random access. The second fallback timer is used to indicate an accumulative duration allowed for initiating the random access based on the second random access resource before re-falling back to the first random access resource from the second random access resource to initiate the random access.

For example, the second fallback threshold is N2, if the number of the random access reinitiated by the UE in the second random access resource fallen back to from the first random access resource reaches N2, and a total number of the random access initiated currently does not reach a maximum number of the random access (such as a preamble TransMax), the UE may fall back to the first random access resource again to initiate the random access.

When the first random access resource is a resource in a specified random access resource pool corresponding to the target network slice, the UE may preferentially fall back to a resource in the specified random access resource pool corresponding to the target network slice. Until the preset fallback condition is met again, the UE performs the resource fallback again. In some embodiments, the UE falls back to the resource in the specified random access resource pool corresponding to the target network slice, and the total number of the random access initiated reaches the maximum number of the random access, the UE may report a random access failure message to an upper layer.

For another example, if a duration of the second fallback timer is t2, an accumulative duration of the random access initiated by the UE in the second random access resource fallen back to from the first random access resource reaches t2, and a total number of the random access initiated currently does not reach the maximum number of the random access, the UE may fall back to the first random access resource again to initiate the random access. That is, the UE may preferentially select a resource in the specified random access resource pool corresponding to the target network slice to initiate the random access again. Until the preset fallback condition is met again, the UE performs the resource fallback again. In some embodiments, the UE falls back to the resource in the specified random access resource pool corresponding to the target network slice, and the total number of the random access initiated reaches the maximum number of the random access, the UE may report a random access failure message to an upper layer.

In the above embodiments, it is possible to avoid the UE to keep initiating the random access in the second random access resource after falling back to the second access resource until reaching the maximum number of the random access, which also the failure of the random access. After at least one collision occurs in the second random access resource, the UE may re-fall back to the first random access resource to initiate the random access, so as to improve the success rate of the random access of the UE.

In some embodiments, if neither the second fallback threshold nor the second fallback timer is configured in the random access resource fallback indication message, after the UE suffers from a failed random access in the second random access resource fallen back to from the first random access resource, and the total number of the random access initiated currently does not reach the maximum number of the random access, the UE may re-fall back to the first random access resource to reinitiate the random access. The first random access resource may include a resource in the specified random access resource pool corresponding to the target network slice.

In the above embodiments, it is possible to avoid the UE to keep initiating the random access in the second random access resource after falling back to the second access resource until reaching the maximum number of the random access, which also leads to the failure of the random access.

After the collision occurs once in the second random access resource, the UE may re-fall back to the first random access resource to initiate the random access, so as to improve the success rate of the random access of the UE.

In some embodiments, the random access resource fallback indication message may carry a fallback factor. In some embodiments, the fallback factor may be a fallback probability value, so that the UE implements a probabilistic fallback.

In embodiments of the present disclosure, after receiving the random access resource fallback indication message, the UE may generate a random number, and determine whether the resource fallback needs to be performed according to the generated random number and the fallback probability value carried in the random access resource fallback indication message. When it is determined that the resource fallback needs to be performed, the random access may be reinitiated based on the second random access resource fallen back to.

In an implementation, the UE may randomly generate, but is not limited to, a random number that satisfies a uniform distribution, and the random number may be, but not limited to, within a range of [0, 1]. If the generated random number is less than the fallback probability value, the UE performs the random access resource fallback. If the generated random number is greater than or equal to the fallback probability value, the random access resource fallback may not be performed.

In an implementation, the UE may generate a random number satisfying other distributions. If the generated random number is greater than the fallback probability value, the UE performs the random access resource fallback. If the generated random number is less than or equal to the fallback probability value, the UE may not perform resource fallback.

In the above embodiments, the UE may determine whether to perform the resource fallback based on the fallback probability value carried in the random access resource fallback indication message and the generated random number, and then reinitiate the random access based on the second random access resource fallen back to. This prevents the UE from always initiating the random access in the first random access resource until reaching the maximum number of the random access, resulting in the failure of the random access, and enables the UE to achieve the purpose of probabilistic fallback, and improves the success rate of the random access of the UE.

In some embodiments, the random access resource fallback indication message does not carry the fallback factor, so that all UEs that receive the random access resource fallback indication message perform the resource fallback.

In some embodiments, the base station may carry the random access resource fallback indication message corresponding to the target network slice in a random access response message. In some embodiments, the base station may carry the random access resource fallback indication message corresponding to the target network slice in a fifth RRC message.

In some embodiments, the UE may adopt a corresponding manner to determine the second random access resource for any of the following cases.

In a first case, when the first random access resource is the two-step specified random access resource, the UE initiates the random access in the two-step specified random access resource, at least one of the above preset fallback condition is met, and it is determined according to the resource configuration information and the slice information that the base station has configured the four-step specified random access resource, the UE may select to fall back to the four-step specified random access resource to reinitiate the random access. That is, the four-step specified random access resource is used as the second random access resource.

In a second case, when the first random access resource is the two-step specified random access resource, the UE initiates the random access in the two-step specified random access resource, at least one of the above preset fallback condition is met, and it is determined according to the resource configuration information and the slice information that the base station has configured the common random access resource, the UE may determine the second random access resource from the common random access resource according to the resource configuration information and the signal quality. That is, the two-step common random access resource or the four-step common random access resource is selected as the second random access resource.

In a third case, when the first random access resource is the two-step specified random access resource, the UE initiates the random access in the two-step specified random access resource, at least one of the above preset fallback condition is met, and it is determined according to the resource configuration information and the slice information that the base station has configured the common random access resource, the UE may determine, according to first indication information sent by the base station, that it is capable of falling back to the common random access resource to reinitiate the random access, and then determine the second random access resource from the common random access resource according to the resource configuration information and the signal quality. That is, the two-step common random access resource or the four-step common random access resource is selected as the second random access resource.

In an implementation, if the base station has configured the two-step common random access resource, and a signal quality is greater than a third threshold, the UE may determine the two-step common random access resource as the second random access resource. The third threshold is used for the UE to determine whether it is capable of falling back to the two-step common random access resource to reinitiate the random access.

Specifically, the base station may configure the third threshold corresponding to at least one network slice via a fifth system message or a sixth RRC message. The third threshold may reuse a legacy RSRP threshold, or may be configured separately by the base station. Likewise, the base station may configure the same or different third thresholds for each network slice or each network slice group.

In an implementation, the base station has configured the two-step common random access resource and the four-step common random access resource, but the signal quality is less than or equal to the third threshold, then the UE may determine the four-step specified random access resource as the second random access resource.

In an implementation, if the base station has not configured the four-step common random access resource, and the signal quality is less than or equal to the third threshold, the UE may not fall back.

The foregoing embodiments may exist alone or in combination, which is not limited in the present application.

In a fourth case, the first random access resource belongs to the common random access resource, that is, the UE initiates the random access in the common random access resource, when the preset fallback condition is met, the fallback may not be performed.

In some embodiments, it may be determined according to the resource configuration information and the slice information that the base station has configured the four-step common random access resource, and the four-step common random access resource is determined as the second random access resource.

In some embodiments, in a case where it is determined according to the resource configuration information and the slice information that the base station has configured the specified random access resource corresponding to the target network slice, the second random access resource may be determined from the specified random access resource corresponding to the target network slice according to the resource configuration information and the signal quality.

In some embodiments, in a case where it is determined according to the resource configuration information and the slice information that the base station has configured the specified random access resource corresponding to the target network slice, and it is determined according to an indication from the network side that it is possible to fall back to the specified random access resource corresponding to the target network slice to reinitiate the random access, the second random access resource may be determined from the specified random access resource corresponding to the target network slice according to the resource configuration information and the signal quality.

In an implementation, if it is determined according to the resource configuration information that the base station has configured the four-step specified random access resource, the four-step specified random access resource may be directly determined as the second random access resource.

In an implementation, if it is determined according to the resource configuration information that the base station has configured the four-step specified random access resource, and the signal quality is greater than a fourth threshold, the four-step specified random access resource may be determined as the second random access resource. The fourth threshold is used for the UE to determine whether it is capable of falling back to a specified random access resource to reinitiate the random access. The fourth threshold may be configured by the base station via a sixth system message or a seventh RRC message, the fourth threshold may also reuse a legacy RSRP threshold, or may be configured by the base station separately. Likewise, the base station may configure the same or different fourth thresholds for each network slice or each network slice group.

The above are just illustrative descriptions, and the UE may determine the second random access resource based on any one or a combination of the above embodiments, or in a case where the UE reinitiates the random access based on the second random access resource, and the preset fallback condition is met again, the UE does not perform the fallback or determines a third random access resource in a similar way, so as to avoid the UE to keep initiating the random access in the same random access resource until reaching the maximum number of the random access, resulting in the failure of the random access, and to improve the success rate of the random access of the UE.

It should also be noted that if the above threshold is configured by base station via both the system message and the RRC message, UE may use the threshold configured based on the RRC message.

Next, random access solutions provided by the present disclosure will be described from the side of the base station.

Figure 4:
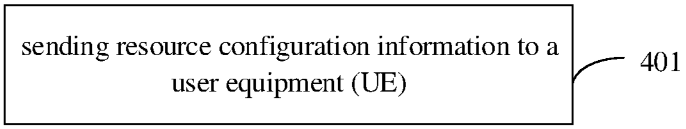
FIG. 4 is a schematic flowchart showing a random access method according to an illustrative embodiment.

Embodiments of the present disclosure provide a random access method, which may be performed by a base station. Referring to FIG. 4, which is a schematic flowchart showing a random access method according to an embodiment, the method may include a following step.

In step 401, resource configuration information is sent to a user equipment (UE).

In embodiments of the present disclosure, the resource configuration information is used to configure at least one of: a common random access resource: a specified random access resource corresponding to at least one network slice: a two-step random access resource: a four-step random access resource: a two-step common random access resource: a four-step common random access resource: a two-step specified random access resource: or a four-step specified random access resource.

In the above embodiments, the base station may configure at least one of the above resources for the UE via the resource configuration information, so as to facilitate the UE to determine a first random access resource to initiate the random access, with high usability.

In some embodiments, the base station may configure a first threshold corresponding to at least one network slice via a system message or an RRC message. The first threshold may be used by the UE to determine whether the specified random access resource corresponding to the target network slice can be selected as the first random access resource to initiate the random access.

Specifically, the base station may configure the first threshold via a first system message or a first RRC message.

In some embodiments, the base station may configure a second threshold corresponding to at least one network slice via a system message or an RRC message. The second threshold may be used for the UE to determine whether the two-step random access resource can be selected as the first random access resource to initiate the random access.

Specifically, the base station may configure the second threshold via a second system message or a second RRC message. In an implementation, the second threshold may include a second threshold #1, which is specifically used for the UE to determine whether the two-step common random access resource can be selected. In this case, the second threshold #1 may be configured by the base station via the second system message or the second RRC message. Specifically, the second threshold #1 may reuse a reference signal receiving power threshold in the related art, i.e., a legacy RSRP threshold.

In an implementation, the second threshold may include a second threshold #2, which is used for the UE to determine whether the two-step specified random access resource can be selected as the first random access resource to initiate the random access. The second threshold #2 may also be configured by the base station via the second system message or the second RRC message, may reuse the legacy RSRP threshold, or may be configured by the base station for each network slice or each network slice group, or reuse the first threshold, which is not limited in the present disclosure. The second threshold #2 may be the same as or different from the second threshold #1, which is also not limited in the present disclosure.

In some embodiments, the base station may configure a first fallback threshold corresponding to at least one network slice via a system message or an RRC message. Here, the first fallback threshold may be used to indicate an allowed cumulative number of failures of the random access initiated based on the first random access resource before falling back to a second random access resource to perform the random access.

Specifically, the base station may configure the first fallback threshold via a third system message or a third RRC message. The first fallback threshold may reuse the legacy threshold, or may be configured separately by the base station.

In some embodiments, the base station may configure a first fallback timer via a system message or an RRC message. The first fallback timer is used to indicate an accumulative duration allowed for initiating the random access based on the first random access resource before falling back to the second random access resource to perform the random access.

Specifically, the base station may configure the first fallback timer via a fourth system message or a fourth RRC message.

In some embodiments, the base station may use a random access response message or a fifth RRC message to carry a random access resource fallback indication corresponding to the target network slice.

In some embodiments, the base station may use first indication information to indicate that the UE can fall back to the common random access resources to reinitiate the random access.

In some embodiments, the base station may use second indication information to indicate that the UE can fall back to the specified random access resource corresponding to the target network slice to reinitiate the random access.

In some embodiments, the base station may configure a third threshold via a system message or an RRC message. The third threshold is used for the UE to determine whether it is capable of falling back to the two-step common random access resource to reinitiate the random access.

Specifically, the base station may configure the third threshold via a fifth system message or a sixth RRC message. The third threshold may reuse a legacy RSRP threshold, or be configured separately by the base station.

In some embodiments, the base station may configure a fourth threshold via a system message or an RRC message. The fourth threshold is used for the UE to determine whether it is capable of falling back to the specified random access resource to reinitiate the random access.

Specifically, the base station may configure the fourth threshold via a sixth system message or a seventh RRC message. The fourth threshold may reuse a legacy RSRP threshold, or configured by the base station for each network slice or each network slice group.

It should be noted that the above system messages may be the same or different, and the RRC messages may also be the same or different, which is not limited in the present disclosure.

As examples, the random access process of the present application will be further described below in combination with different resource configuration information.

In a first case, corresponding to Case 3 specified in a protocol, the base station configures the four-step specified random access resource and the two-step common random access resource for the UE via the resource configuration information. In the related art, when the random access is to be initiated, the four-step specified random access resource is always selected to initiate the random access. If the preset fallback condition is met, the UE does not fall back, or the UE falls back to the common random access resource.

However, according to the random access solutions provided in the present disclosure, the four-step specified random access resource or the two-step common random access resource may be selected in the above manner to initiate the random access. For resource fallback, there are the following two situations:

In a first situation, if the preset fallback condition is met when the random access is initiated in the four-step specified random access resource, the resource fallback is not performed.

In a second situation, if the preset fallback condition is met when the random access is initiated in the two-step common random access resource, the following options may be adopted:

Option 1: not falling back.

Option 2: falling back to the four-step specified random access resource to reinitiate the random access.

Option 3: falling back to the four-step specified random access resource to reinitiate the random access if the signal quality is greater than the fourth threshold.

Option 4: falling back to the four-step specified random access resource to reinitiate the random access if it is determined according to the second indication information sent by the base station that it is possible to fall back to the specified random access resource corresponding to the target network slice: otherwise, not falling back.

Option 5: falling back to the four-step specified random access resource to reinitiate the random access if it is determined according to the second indication information sent by the base station that it is possible to fall back to the specified random access resource corresponding to the target network slice, and the signal quality is greater than the fourth threshold: otherwise, not falling back.

In a second case, corresponding to Case 6 specified in the protocol, the base station configures the two-step specified random access resource and the two-step common random access resource for the UE via the resource configuration information. In the related art, when the random access is to be initiated, the two-step specified random access resource is always selected to initiate the random access. If the preset fallback condition is met, the UE does not fall back, or the UE falls back to the common random access resource.

However, according to the random access solutions provided in the present disclosure, the two-step specified random access resource or the two-step common random access resource may be selected in the above manner to initiate the random access. For resource fallback, in general, the UE may fall back to the two-step common random access resource from the two-step specified random access resource. Therefore, in the following, illustrations are made only with reference to examples where the preset fallback condition is met when the random access is initiated in the two-step specified random access resource, and there are the following options:

Option 1: not falling back.

Option 2: falling back to the two-step specified random access resource to reinitiate the random access.

Option 3: falling back to the two-step specified random access resource to reinitiate the random access if it is determined according to the first indication information sent by the base station that it is possible to fall back to the common random access resource: otherwise not falling back.

In a third case, corresponding to Case 8, the base station configures the two-step specified random access resource, the two-step common random access resource and the four-step common random access resource for the UE via the resource configuration information. In the related art, when the random access is to be initiated, the four-step specified random access resource is always selected to initiate the random access. If the preset fallback condition is met, the UE falls back to the four-step common random access resource from the four-step specified random access resource.

However, according to the random access solutions provided in the present disclosure, any of the two-step specified random access resource, the two-step common random access resource or the four-step common random access resource may be selected in the above manner to initiate the random access. For resource fallback, in general, there may exist situations where the preset fallback condition is met when the random access is initiated in the two-step specified random access resource.

In a first situation, the preset fallback condition is met when the random access is initiated in the four-step specified random access resource, and there are the following options:

Option 1: not falling back.

Option 2: falling back to the four-step common random access resource to reinitiate the random access.

Option 3: falling back to the two-step common random access resource to reinitiate the random access if the signal quality is greater than the third threshold: otherwise, falling back to the four-step common random access resource.

Option 4: falling back to the two-step common random access resource or the four-step common random access resource to reinitiate the random access if it is determined according to the first indication information sent by the base station that it is possible to fall back to the common random access resource: otherwise, not falling back.

Specifically, the UE may fall back to the two-step common random access resource to reinitiate the random access if the signal quality is greater than the third threshold: otherwise, the UE falls back to the four-step common random access resource to reinitiate the random access.

In a second situation, the preset fallback condition is met when the random access is initiated in the two-step common random access resource, and there are the following options:

Option 1: falling back to the four-step common random access resource to reinitiate the random access.

Option 2: falling back to the four-step specified random access resource to reinitiate the random access.

Option 3: falling back to the four-step specified random access resource to reinitiate the random access if the signal quality is greater than the fourth threshold: otherwise, not falling back.

Option 4: falling back to the four-step specified random access resource to reinitiate the random access if it is determined according to the second indication information sent by the base station that it is possible to fall back to the specified random access resource corresponding to the target network slice: otherwise, falling back to the four-step common random access resource to reinitiate the random access.

In a fourth case, corresponding to Case 9 specified in the protocol, the base station configures the four-step specified random access resource, the two-step common random access resource, and the four-step common random access resource for the UE via the resource configuration information. In the related art, there is no solution on how to initiate the random access and how to perform the resource fallback.

According to the random access solutions provided in present disclosure, any one of the four-step specified random access resource, the two-step common random access resource, and the four-step common random access resource may be selected to initiate the random access. For resource fallback, there are the following three situations.

In a first situation, the preset fallback condition is met when the random access is initiated in the two-step specified random access resource, and there are the following options:

Option 1: not falling back.

Option 2: falling back to the four-step specified random access resource to reinitiate the random access.

Option 3: falling back to the two-step common random access resource to reinitiate the random access.

Option 4: falling back to the two-step common random access resource to reinitiate the random access if it is determined according to the first indication information sent by the base station that it is possible to fall back to the common random access resource; otherwise, not falling back.

In a second situation, the preset fallback condition is met when the random access is initiated in the four-step specified random access resource, and there are the following options:

Option 1: not falling back.

Option 2: falling back to the two-step common random access resource to reinitiate the random access.

Option 3: falling back to the two-step common random access resource to reinitiate the random access when the signal quality is greater than the third threshold: otherwise, not falling back.

Option 4: falling back to the two-step common random access resource to reinitiate the random access if it is determined according to the first indication information sent by the base station that it is possible to fall back to the common random access resource: otherwise, not falling back.

Option 5: falling back to the two-step common random access resource to reinitiate the random access if it is determined according to the first indication information sent by the base station that it is possible to fall back to the common random access resource, and the signal quality is greater than the third threshold: otherwise, not falling back.

In a third situation, the preset fallback condition is met when the random access is initiated in the two-step common random access resource, and there are the following options:

Option 1: not falling back.

Option 2: falling back to the four-step specified random access resource to reinitiate the random access.

Option 3: falling back to the four-step specified random access resource to reinitiate the random access when the signal quality is greater than the fourth threshold: otherwise, not falling back.

Option 4: falling back to the four-step specified random access resource to reinitiate the random access if it is determined according to the second indication information sent by the base station that it is possible to fall back to the specified random access resource corresponding to the target network slice, and the signal quality is greater than the fourth threshold: otherwise, not falling back.

Option 5: falling back to the four-step specified random access resource to reinitiate the random access if it is determined according to the second indication information sent by the base station that it is possible to fall back to the specified random access resource corresponding to the target network slice: otherwise, not falling back.

The above embodiments are only illustrative. Other solutions obtained on the basis of the random access solutions provided by the present disclosure to determine the first random access resource, to determine whether to fall back, and to determine the second random access resource to be fallen back to shall belong to the protection scope of the present disclosure.

Corresponding to the foregoing embodiments of the method for implementing application functions, the present disclosure also provides embodiments of devices for implementing the application functions.

Figure 5:
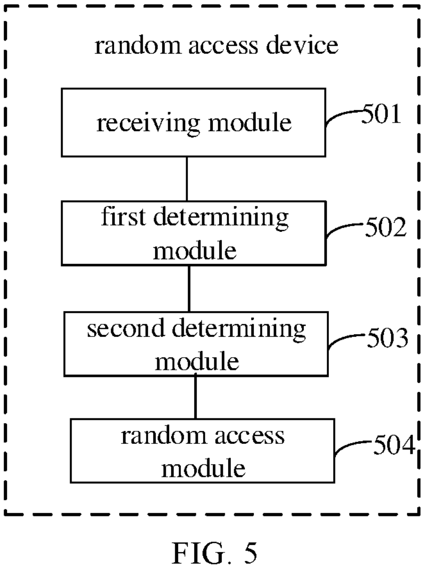
FIG. 5 is a schematic block diagram showing a random access device according to an illustrative embodiment.

Referring to FIG. 5, which shows a random access device according to an illustrative embodiment, the device is applicable to a user equipment (UE), and includes a receiving module 501, a first determining module 502, a second determining module 503, and a random access module 504.

The receiving module 501 is configured to receive resource configuration information sent by a base station.

The first determining module 502 is configured to determine slice information of a target network slice that triggers a random access.

The second determining module 503 is configured to determine a first random access resource according to at least the resource configuration information and the slice information.

The random access module 504 is configured to initiate the random access based on the first random access resource.

The resource configuration information is used to configure at least one of: a common random access resource: a specified random access resource corresponding to at least one network slice: a two-step random access resource: a four-step random access resource: a two-step common random access resource: a four-step common random access resource: a two-step specified random access resource: or a four-step specified random access resource.

Figure 6:
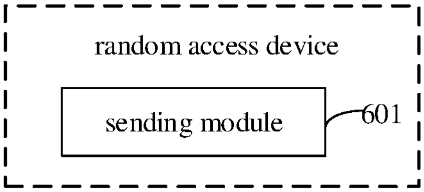
FIG. 6 is a schematic block diagram showing a random access device according to an illustrative embodiment.

Referring to FIG. 6, which shows a random access device according to an illustrative embodiment, the random access device is applicable to a base station, and includes a sending module 601.

The sending module 601 is configured to send resource configuration information to a user equipment (UE).

The resource configuration information is used to configure at least one of: a common random access resource: a specified random access resource corresponding to at least one network slice: a two-step random access resource: a four-step random access resource: a two-step common random access resource: a four-step common random access resource: a two-step specified random access resource: or a four-step specified random access resource.

As for the device embodiments, since they are substantially correspond to the method embodiments, for related parts, reference may be made to the descriptions of the method embodiments. The above-described device embodiments are merely for the purpose of illustration, in which units described as separate components may be or may not be physically separated, and the components displayed as units may be or may not be physical units, that is, either located at one place or distributed onto a plurality of network units. The objects of embodiments of the present disclosure may be achieved by some or all of the modules in accordance with practical requirements. It would be appreciated and executable by those skilled in the art without creative efforts.

Correspondingly, the present disclosure also provides a computer-readable storage medium having stored therein a computer program for executing the random access method as described in any above embodiments with respect to the UE.

Correspondingly, the present disclosure also provides a computer-readable storage medium having stored therein a computer program for executing the random access method as described in any above embodiments with respect to the base station.

Correspondingly, the present disclosure also provides a random access device, which includes a processor; and a memory for storing an instruction executable by the processor. The processor is configured to execute the random access method as described in any above embodiments with respect to the UE.

Figure 7:
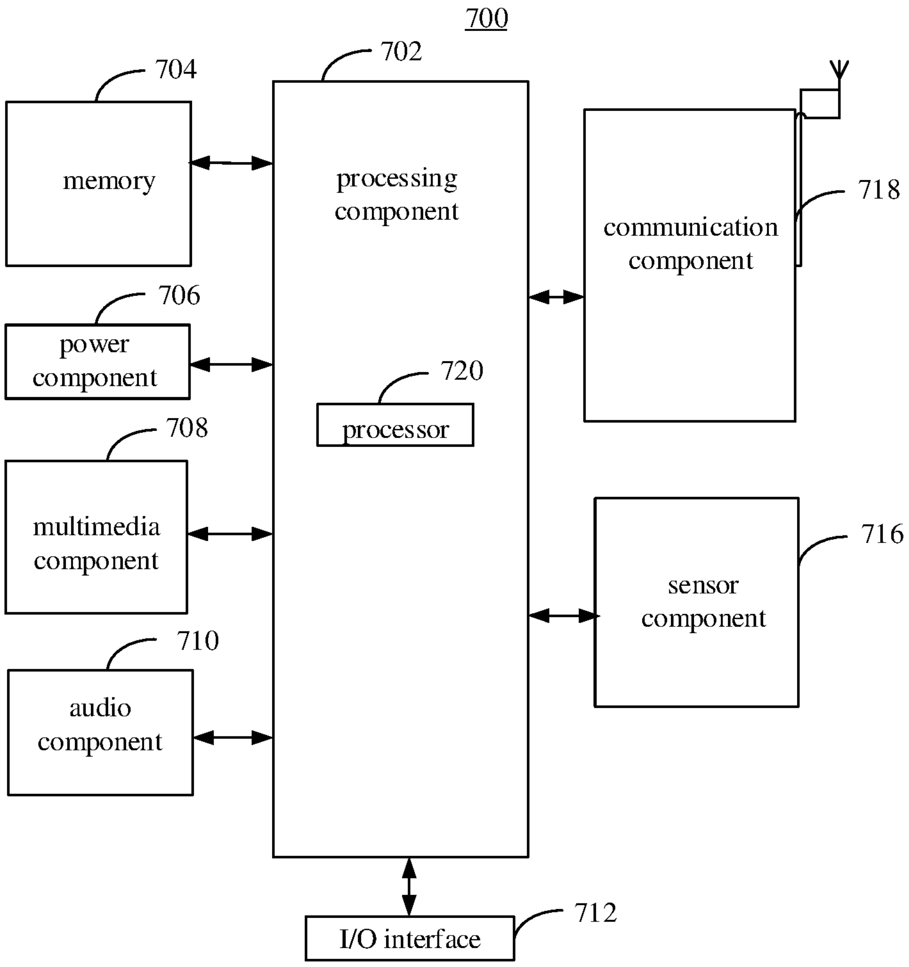
FIG. 7 is a schematic structural diagram showing a random access device according to an illustrative embodiment of the present disclosure.

FIG. 7 is a block diagram showing an electronic device 700 according to an illustrative embodiment. For example, the electronic device 700 may be a mobile phone, a tablet, an e-book reader, a multimedia playback device, a wearable device, a vehicle user device, an ipad, a smart TV and other user equipment.

Referring to FIG. 7, the electronic device 700 may include one or more of the following components: a processing component 702, a memory 704, a power component 706, a multimedia component 708, an audio component 710, an input/output (I/O) interface 712, a sensor component 716, and a communication component 718.

The processing component 702 typically controls overall operations of the electronic device 700, such as the operations associated with display, phone calls, data random access, camera operations, and recording operations. The processing component 702 can include one or more processors 720 to execute instructions to perform all or some of the steps in the above-described random access methods. Moreover, the processing component 702 may include one or more multimedia modules which facilitate the interaction between the processing component 702 and the multimedia component 708. In another example, the processing component 702 may read executable instructions from the memory to implement the steps of the random access methods provided by the various embodiments above.

The memory 704 is configured to store various types of data to support the operation of the electronic device 700. Examples of such data include instructions for any applications or methods operated on the electronic device 700, contact data, phonebook data, messages, pictures, videos, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 may include a power management system, one or more power sources, and any other components associated with the generation, management, and distribution of power in the electronic device 700.

The multimedia component 708 includes a screen providing an output interface between the electronic device 700 and the user. In some embodiments, the multimedia component 708 includes a front camera and/or a rear camera. The front camera and/or the rear camera may receive an external multimedia datum while the electronic device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the electronic device 700 is in an operation mode, such as a call mode, a recording mode, and a voice recognition mode. The received audio signal may be further stored in the memory 704 or transmitted via the communication component 718. In some embodiments, the audio component 710 further includes a speaker to output audio signals.

The I/O interface 712 provides an interface between the processing component 702 and peripheral interface modules, such as keyboards, click wheels, buttons, and the like. The buttons may include, but are not limited to, a home button, a volume button, a starting button, and a locking button.

The sensor component 716 includes one or more sensors to provide status assessments of various aspects of the electronic device 700. For instance, the sensor component 716 may detect an open/closed status of the electronic device 700, relative positioning of components, e.g., the display and the keypad, of the electronic device 700, a change in position of the electronic device 700 or a component of the electronic device 700, a presence or absence of user contact with the electronic device 700, an orientation or an acceleration/deceleration of the electronic device 700, and a change in temperature of the electronic device 700. The sensor component 716 may include a proximity sensor configured to detect the presence of nearby objects without any physical contact. The sensor component 716 may further include a light sensor, such as a CMOS or CCD image sensor, for use in imaging applications. In some embodiments, the sensor component 716 may further include an accelerometer sensor, a gyroscope sensor, a magnetic sensor, a pressure sensor, or a temperature sensor.

The communication component 718 is configured to facilitate communication, wired or wireless, between the electronic device 700 and other devices. The electronic device 700 can access a wireless network based on a communication standard, such as Wi-Fi, 2G, 3G, 4G, 5G, 6G, or a combination thereof. In an illustrative embodiment, the communication component 718 receives a broadcast signal or broadcast associated information from an external broadcast management system via a broadcast channel. In an illustrative embodiment, the communication component 718 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the electronic device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing steps of the random access method in any embodiment described above with respect to the user equipment.

In an illustrative embodiment, there is also provided a non-transitory machine readable storage medium including instructions, such as included in the memory 704, executable by the processor 720 in the electronic device 700, for completing the above-mentioned random access method. For example, the non-transitory computer-readable storage medium may be a ROM, a random access memory (RAM), a CD-ROM, a magnetic tape, a floppy disc, an optical data storage device, and the like.

Correspondingly, the present disclosure also provides a random access device, which includes: a processor; and a memory for storing an instruction executable by the processor. The processor is configured to execute the random access method in any embodiment described above with respect to the base station.

Figure 8:
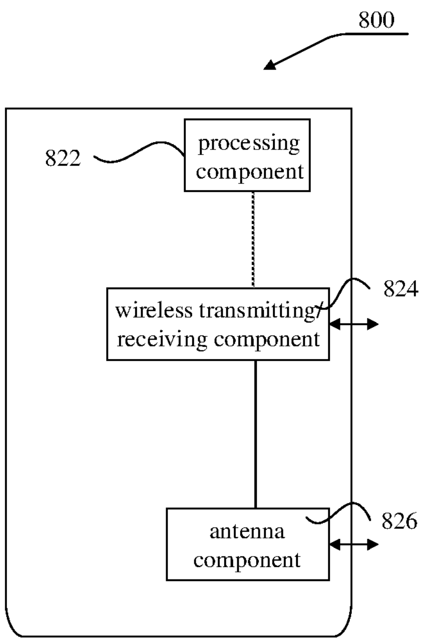
FIG. 8 is a schematic structural diagram showing a random access device according to an illustrative embodiment of the present disclosure.

As shown in FIG. 8, which is a schematic structural diagram of a random access device 800 according to an illustrative embodiment. The device 800 may be provided as a base station. Referring to FIG. 8, the device 800 includes a processing component 822, a wireless transmitting/receiving component 824, an antenna component 826, and a signal processing part specific to a wireless interface. The processing component 822 may further include one or more processors.

One of the processors in the processing component 822 may be configured to execute the random access method in any embodiment described above with respect to the base station.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A random access method, performed by a user equipment (UE), comprising:

receiving resource configuration information sent by a base station;

determining slice information of a target network slice that triggers a random access;

determining a first random access resource according to the resource configuration information and the slice information; and initiating the random access based on the first random access resource;

wherein the resource configuration information is used to configure at least one of: a common random access resource; a specified random access resource corresponding to at least one network slice; a two-step random access resource; a four-step random access resource; a two-step common random access resource; a four-step common random access resource; a two-step specified random access resource; or a four-step specified random access resource, wherein determining the first random access resource according to the resource configuration information and the slice information comprises:

determining that the base station has configured the two-step random access resource and the four-step random access resource, according to the resource configuration information and the slice information;

in response to determining that a signal quality is greater than a threshold, determining the two-step random access resource as a candidate resource;

in response to determining that the signal quality is less than or equal to the threshold, determining the four-step random access resource as the candidate resource; and determining the first random access resource based on the candidate resource, wherein the threshold corresponds to at least one network slice and is configured by the base station via a system message broadcast.

2. The method according to claim 1, wherein determining the first random access resource according to the resource configuration information and the slice information comprises:

determining that the base station has configured at least a specified random access resource corresponding to the target network slice, according to the resource configuration information and the slice information;

determining the specified random access resource corresponding to the target network slice as a candidate resource; and determining the first random access resource based on the candidate resource.

3. The method according to claim 1, wherein determining the first random access resource according to the resource configuration information and the slice information comprises:

determining that the base station has not configured a specified random access resource corresponding to the target network slice, but has configured the common random access resource, according to the resource configuration information and the slice information;

determining the common random access resource as a candidate resource; and determining the first random access resource based on the candidate resource.

4. The method according to claim 1, wherein determining the first random access resource according to the resource configuration information and the slice information comprises:

determining that the base station has configured at least a specified random access resource corresponding to the target network slice and the common random access resource, according to the resource configuration information and the slice information;

in response to determining that a signal quality is greater than a first threshold, determining the specified random access resource corresponding to the target network slice as a candidate resource;

in response to determining that the signal quality is less than or equal to the first threshold, determining the common random access resource as the candidate resource; and determining the first random access resource based on the candidate resource.

5. The method according to claim 1, wherein determining the first random access resource according to the resource configuration information and the slice information comprises:

determining that the base station has configured the two-step random access resource or the four-step random access resource, according to the resource configuration information;

determining the two-step random access resource or the four-step random access resource as a candidate resource; and determining the first random access resource based on the candidate resource.

6. The method according to claim 2, wherein determining the first random access resource based on the candidate resource comprises one of:

in a case where the candidate resource comprises one of the common random access resource, the specified random access resource corresponding to the target network slice, the two-step random access resource or the four-step random access resource, determining the candidate resource as the first random access resource;

in a case where the candidate resource comprises the common random access resource, determining the two-step common random access resource or the four-step common random access resource as the first random access resource;

in a case where the candidate resource comprises the specified random access resource corresponding to the target network slice, determining the two-step specified random access resource or the four-step specified random access resource as the first random access resource;

in a case where the candidate resource comprises the two-step random access resource, determining the two-step common random access resource or the two-step specified random access resource as the first random access resource; or in a case where the candidate resource comprises the four-step random access resource, determining the four-step common random access resource or the four-step specified random access resource as the first random access resource.

7. The method according to claim 6, wherein in the case where the candidate resource comprises the specified random access resource corresponding to the target network slice, determining the two-step specified random access resource or the four-step specified random access resource as the first random access resource comprises:

in the case where the candidate resource comprises the specified random access resource corresponding to the target network slice, determining that the base station has configured at least the two-step specified random access resource and the four-step specified random access resource according the resource configuration information; and performing one of:

in response to determining that a signal quality is greater than a second threshold, determining the two-step specified random access resource as the first random access resource; or in response to determining that a signal quality is less than or equal to a second threshold, determining the four-step specified random access resource as the first random access resource.

8. The method according to claim 6, wherein in the case where the candidate resource comprises the two-step random access resource, determining the two-step common random access resource or the two-step specified random access resource as the first random access resource comprises:

in the case where the candidate resource comprises the two-step random access resource, determining that the base station has configured the two-step common random access resource and the two-step specified random access resource according to the resource configuration information; and performing one of:

determining the two-step specified random access resource as the first random access resource;

in response to determining that a signal quality is greater than a second threshold, determining the two-step specified random access resource as the first random access resource; or in response to determining that a signal quality is less than or equal to a second threshold, determining the two-step common random access resource as the first random access resource.

9. The method according to claim 6, wherein in the case where the candidate resource comprises the four-step random access resource, determining the four-step common random access resource or the four-step specified random access resource as the first random access resource according to the resource configuration information comprises:

in the case where the candidate resource comprises the four-step random access resource, determining that the base station has configured the four-step common random access resource and the four-step specified random access resource according to the resource configuration information; and performing one of:

determining the four-step specified random access resource as the first random access resource;

in response to determining that a signal quality is greater than a first threshold, determining the four-step specified random access resource as the first random access resource; or in response to determining that a signal quality is less than or equal to a first threshold, determining the four-step common random access resource as the first random access resource.

10. The method according to claim 1, further comprising:

in response to meeting a preset fallback condition, determining a second random access resource to be fallen back to; and reinitiating the random access based on the second random access resource, wherein the preset fallback condition comprises one of:

a number of failures of the random access initiated based on the first random access resource reaching a first fallback threshold;

a first fallback timer expiring; or receiving a random access resource fallback indication message corresponding to the target network slice.

11. The method according to claim 10, wherein the first random access resource is the two-step specified random access resource, wherein determining the second random access resource to be fallen back to comprises one of:

determining that the base station has configured the four-step specified random access resource according to the resource configuration information and the slice information; and determining the four-step specified random access resource as the second random access resource;

determining that the base station has configured the common random access resource according to the resource configuration information and the slice information; and determining the second random access resource from the common random access resource according to the resource configuration information and a signal quality; or determining that the base station has configured the common random access resource according to the resource configuration information and the slice information; determining to be capable of falling back to the common random access resource to reinitiate the random access, according to first indication information sent by the base station; and determining the second random access resource from the common random access resource according to the resource configuration information and a signal quality.

12. The method according to claim 11, wherein determining the second random access resource from the common random access resource according to the resource configuration information and the signal quality comprises:

determining that the base station has configured the two-step common random access resource according to the resource configuration information;

determining that the signal quality is greater than a third threshold; and determining the two-step common random access resource as the second random access resource.

13. The method according to claim 10, wherein the first random access resource belongs to the common random access resource, wherein determining the second random access resource to be fallen back to comprises one of:

determining that the base station has configured the four-step common random access resource according to the resource configuration information and the slice information; and determining the four-step common random access resource as the second random access resource;

determining that the base station has configured a specified random access resource corresponding to the target network slice according to the resource configuration information and the slice information; and determining the second random access resource from the specified random access resource corresponding to the target network slice according to the resource configuration information and a signal quality; or determining that the base station has configured a specified random access resource corresponding to the target network slice according to the resource configuration information and the slice information; determining to be capable of falling back to the specified random access resource corresponding to the target network slice to reinitiate the random access, according to second indication information sent by the base station; and determining the second random access resource from the specified random access resource corresponding to the target network slice according to the resource configuration information and a signal quality.

14. The method according to claim 13, wherein determining the second random access resource from the specified random access resource corresponding to the target network slice according to the resource configuration information and the signal quality comprises one of:

determining that the base station has configured the four-step specified random access resource according to the resource configuration information; and determining the four-step specified random access resource as the second random access resource; or determining that the base station has configured the four-step specified random access resource according to the resource configuration information; determining that the signal quality is greater than a fourth threshold; and determining the four-step specified random access resource as the second random access resource.

15. A non-transitory computer-readable storage medium having stored therein a computer program that, when executed by a processor, causes the processor to perform the random access method according to claim 1.

16. The method according to claim 1, further comprising:
in response to meeting a preset fallback condition, not performing a resource fallback.

17. The method according to claim 16, wherein in response to meeting the preset fallback condition, not performing the resource fallback comprises one of:
in response to meeting the preset fallback condition when the random access is initiated by using a specified random access resource corresponding to the target network slice as the first random access resource, not performing the resource fallback; or
in response to meeting the preset fallback condition when the random access is initiated by using the common random access resource as the first random access resource, not performing the resource fallback.

18. A random access method, performed by a base station, comprising:
sending resource configuration information to a user equipment (UE);
wherein the resource configuration information is used to configure at least one of: a common random access resource; a specified random access resource corresponding to at least one network slice; a two-step random access resource; a four-step random access resource; a two-step common random access resource; a four-step common random access resource; a two-step specified random access resource; or a four-step specified random access resource,
wherein the method further comprises:
broadcasting a system message, wherein the system message is used to configure a threshold corresponding to at least one network slice, and the threshold is configured for the UE to:
in response to determining, according to the resource configuration information and slice information of a target network slice that triggers the random access, that the base station has configured the two-step random access resource and the four-step random access resource, and
in response to determining that a signal quality is greater than the threshold, determine the two-step random access resource as a candidate resource; or
in response to determining that the signal quality is less than or equal to the threshold, determining the four-step random access resource as the candidate resource.

19. A random access device, comprising:
a processor; and
a memory for storing an instruction executable by the processor;
wherein the processor is configured to:
receive resource configuration information sent by a base station;
determine slice information of a target network slice that triggers a random access;
determine a first random access resource according to at least one of the resource configuration information and the slice information; and
initiate the random access based on the first random access resource,
wherein the resource configuration information is used to configure at least one of: a common random access resource; a specified random access resource corresponding to at least one network slice; a two-step random access resource; a four-step random access resource; a two-step common random access resource; a four-step common random access resource; a two-step specified random access resource; or a four-step specified random access resource,
wherein the processor is further configured to:
determine that the base station has configured the two-step random access resource and the four-step random access resource, according to the resource configuration information and the slice information;
in response to determining that a signal quality is greater than a threshold, determine the two-step random access resource as a candidate resource;
in response to determining that the signal quality is less than or equal to the threshold, determine the four-step random access resource as the candidate resource; and
determine the first random access resource based on the candidate resource,
wherein the threshold corresponds to at least one network slice and is configured by the base station via a system message broadcast.

20. A random access device, comprising:
a processor; and
a memory for storing an instruction executable by the processor;
wherein the processor is configured to perform the random access method according to claim 18.

* * * * *